United States Patent
Hammer et al.

(10) Patent No.: US 8,561,020 B2
(45) Date of Patent: Oct. 15, 2013

(54) METHOD FOR THE COMPUTER-AIDED DETERMINATION OF THE DEPENDENCIES OF A PLURALITY OF MODULES OF A TECHNICAL SYSTEM, ESPECIALLY OF A SOFTWARE SYSTEM

(75) Inventors: Moritz Hammer, München (DE); Kurt Majewski, München (DE); Florian Mangold, München (DE); Christoph Moll, München (DE); Harald Rölle, München (DE); Rainer Wasgint, München (DE)

(73) Assignee: Siemens Aktiengesellschaft, Munich (DE)

( * ) Notice: Subject to any disclaimer, the term of this patent is extended or adjusted under 35 U.S.C. 154(b) by 916 days.

(21) Appl. No.: 12/450,288

(22) PCT Filed: Mar. 5, 2008

(86) PCT No.: PCT/EP2008/052641
§ 371 (c)(1),
(2), (4) Date: Sep. 18, 2009

(87) PCT Pub. No.: WO2008/113682
PCT Pub. Date: Sep. 25, 2008

(65) Prior Publication Data
US 2010/0088663 A1    Apr. 8, 2010

(30) Foreign Application Priority Data

Mar. 20, 2007 (DE) .......................... 10 2007 013 396
Jun. 25, 2007 (DE) .......................... 10 2007 029 133

(51) Int. Cl.
*G06F 9/44* (2006.01)

(52) U.S. Cl.
USPC ............ 717/111; 717/116; 717/144; 717/148

(58) Field of Classification Search
None
See application file for complete search history.

(56) References Cited

U.S. PATENT DOCUMENTS 5,365,606 A * 11/1994 Brocker et al. ................ 719/331
5,828,883 A   10/1998 Hall (Continued)

FOREIGN PATENT DOCUMENTS

| WO | WO 9803917 A1 | 1/1998 |
| WO | WO 2005045673 A2 | 5/2005 |
| WO | WO 2008040662 A2 | 4/2008 |

OTHER PUBLICATIONS

Title: Live, Runtime Phase Monitoring and Prediction on Real Systems with Application to Dynamic Power Man, author: Canturk Isci, et al, source: IEEE, dated: 2006.*

(Continued)

*Primary Examiner* — Chameli Das
(74) *Attorney, Agent, or Firm* — Harness, Dickey & Pierce

(57) ABSTRACT

An embodiment of the present invention discloses a method for the computer-aided determination of the dependencies of a plurality of modules of a technical system, especially of a software system. Every module of the system has a known, first consumption of resources. The first consumption of resources of at least one of the modules is modified according to a predetermined criterion, thereby obtaining a modified system. The modified system is executed. A second consumption of resources is measured for every module of the modified system, the consumption resulting from the modification of the first consumption of resources of the at least one module. An analysis of the second consumption of resources of a respective module and the predetermined criterion is used to determine whether there is a dependency between the respective module and the at least one module that is characterized by the modified consumption of resources.

12 Claims, 4 Drawing Sheets

(56) References Cited

U.S. PATENT DOCUMENTS

| | | | | |
|---|---|---|---|---|
| 5,831,864 | A | * | 11/1998 | Raghunathan et al. ....... 716/104 |
| 6,266,805 | B1 | | 7/2001 | Lee |
| 6,381,735 | B1 | | 4/2002 | Hunt |
| 6,405,364 | B1 | | 6/2002 | Bowman-Amuah |
| 7,865,872 | B2 | * | 1/2011 | Chamieh et al. ............. 717/108 |
| 7,971,182 | B1 | * | 6/2011 | Vlaovic et al. ................ 717/104 |
| 7,996,814 | B1 | * | 8/2011 | Qureshi et al. ................ 717/120 |
| 8,001,527 | B1 | * | 8/2011 | Qureshi et al. ................ 717/120 |
| 2003/0056199 | A1 | | 3/2003 | Li |
| 2004/0243978 | A1 | * | 12/2004 | Walmsley ..................... 717/120 |
| 2005/0091674 | A1 | * | 4/2005 | Knight et al. ................. 719/332 |
| 2005/0177633 | A1 | * | 8/2005 | Plunkett ........................ 709/225 |
| 2006/0037000 | A1 | * | 2/2006 | Speeter et al. ................ 717/120 |
| 2006/0184410 | A1 | * | 8/2006 | Ramamurthy et al. ........... 705/8 |
| 2007/0294663 | A1 | * | 12/2007 | McGuire et al. ............. 717/108 |
| 2009/0037899 | A1 | * | 2/2009 | Dharap et al. ................ 717/173 |
| 2011/0010715 | A1 | * | 1/2011 | Papakipos et al. ........... 718/100 |
| 2011/0022707 | A1 | * | 1/2011 | Bansal et al. ................. 709/224 |

OTHER PUBLICATIONS

Jun Li Ed—Institute of Electrical and Electronics Engineers: "Monitoring and Characterization of Component-based Systems with Global Causability Capture", Proceedings of the 23rd International Conference on Distributed Computing Systems. ICDCS 2003. Providence, RI. May 19-22, 2003, Los Alamitos, CA; IEEE Comp. Soc., US, vol. CONF 23, May 19, 2003, pp. 422-431; Others.

Bermudo N. et al., "Control Flow gaph Reconstruction for Assembly Language Programs with Delayed Instructions". Sep. 39, 2005, Source Code Analysis and Manipulation, 2005, Fifth IEEE International Workshop on Budapest, Hungary, Sep. 2005, Piscataway, NJ, USA, IEEE. pp. 107-118; Others.

Michael D. Smith. "Overcoming the Challenges to Feedback-Directed Optimization", ACM Sigplan Notices, ACM Association for Computing Machinery, New York, NY, US, Jan. 1, 2000,; Others.

Internet: Whitepaper "Optimizing Speed vs. Size—Using the CodeBalance Utility for ARM/Thumb and MIPS16 Architectures", Nov. 30, 1998, http://www.ghs.com/wp/codebal.pdf; Others.

Internet: http://javaboutique.internet.com/ImageShuffle/: Others, 2009, retrieved on Jul. 15, 2009.

* cited by examiner

METHOD FOR THE COMPUTER-AIDED DETERMINATION OF THE DEPENDENCIES OF A PLURALITY OF MODULES OF A TECHNICAL SYSTEM, ESPECIALLY OF A SOFTWARE SYSTEM

PRIORITY STATEMENT

This application is the national phase under 35 U.S.C. §371 of PCT International Application No. PCT/EP2008/052641 which has an International filing date of Mar. 5, 2008, which designated the United States of America, and which claims priority on German patent application numbers DE 10 2007 013 396.2 filed Mar. 20, 2007 and DE 10 2007 029 133.9 filed Jun. 25, 2007, the entire contents of each of which are hereby incorporated herein by reference.

FIELD

At least one embodiment of the invention generally relates to a method for the computer-aided determination of the dependencies of a plurality of modules of a technical system, in particular of a software system, with each of the modules of the system having a known first resource consumption.

BACKGROUND

Complex software systems comprise a plurality of different and to some extent interacting modules. In this context a module can also be a method, function, etc. The problem frequently arises here that the performance of the software system is not satisfactory. A high level of understanding of the software system is necessary to discover which module(s) is/are responsible for the poor performance.

So-called call graphs are a known analysis instrument for software development. A software system can be displayed as a cal graph making it easier to understand. The graph, which is easy for programmers to read, shows the structure and architecture of a software system in readily understood manner. This makes it easy to modify and test the software system. The call graph documents, clarifies and increases understanding of program code and software systems.

Call graphs map calls and dependencies of the individual components on one another as edges in the graph. With synchronous software systems in particular the call graph is a proven analysis and documentation tool. During the analysis, in particular the performance analysis, of complex multithreading software systems however calls are not the only dependencies of the software system. Reciprocal blocking, commonly used hardware resources and many other things produce dependencies, which influence the runtime of the software system.

A tool, which allows the creation of a call graph and also demonstrates resource-consuming dependencies in a software system would therefore be desirable. Such a dependency graph could be used not only in software development and analysis but also during the development, analysis and documentation of any technical systems. Dependency graphs facilitate an understanding of cohesive technical systems.

SUMMARY

At least one embodiment of the present invention specifies a method, which allows the computer-aided determination of the dependencies of a plurality of modules of a technical system.

With at least one embodiment of the inventive method for the computer-aided determination of the dependencies of a plurality of modules of a technical system, in particular of a software system, with each of the modules of the system having a known, first resource consumption, the first resource consumption of at least one of the modules is modified according to a predetermined criterion, resulting in a modified system. The modified system is executed. A second resource consumption is measured for each of the modules of the modified system, this second resource consumption resulting from the modification of the first resource consumption of the at least one module. The analysis of the second resource consumption of a respective module and the predetermined criterion are used to determine whether there is a dependency between the respective module and the at least one module with modified resource consumption.

At least one embodiment of the inventive method uses artificial variance to modify the resource consumption of at least one of the modules specifically, in particular to increase it. By measuring the resource consumption which results due to the modification of the resource consumption of the at least one module, it is possible to reconstruct dependencies and display them in the form of a directed graph, in particular of a network. Analysis of the second resource consumption of a respective module in conjunction with the predetermined criterion not only allows dependencies to be ascertained but also allows capacity information to be determined, which is assigned to the edges of the directed graph. The capacity information represents a measure of the dependency of the modules.

The dependencies of the plurality of modules of the technical system can be determined using at least one embodiment of the inventive method without knowledge of the technical system in its entirety, in particular in the case of software systems without further code review. This means that the technical system to be analyzed can be present as a black box. The graph produced by way of at least one embodiment of the inventive method represents an extension of conventional, known call graphs and can be deployed effectively for concurrent systems in particular. The graph produced using the method provides developers and analysts with information indicating those modules or components for which reengineering or refactoring is advantageous or otherwise. The invention can be used to understand dynamic and highly complex systems. It demonstrates optimization potential in particular.

According to one example embodiment, the modification of the first resource consumption of the at least one module is an increase in the first resource consumption. According to a further development the second resource consumption is a runtime of the relevant module. The dependencies of the modules of the system are thus reconstructed by way of runtime measurements of the respective modules of the modified system.

In a first variant the first resource consumption of just one of the modules is modified. The predetermined criterion is expediently an arbitrary factor taking into account the possible measurement accuracy when measuring the second resource consumption. Provision is also made here for at least one embodiment of the method to be repeated according to the number of modules in the system, with the first resource consumption of a different module being modified with each repetition, so that each module of the system undergoes a modification just once. The principle of this variant is based on increasing the resource consumption of a module of the system artificially, starting the system and measuring the dependencies. This has to be done for all the modules, in order to be able to create a graph. This means that the system has to be started at least once for each module. If the graph created by means of the inventive method is to be used to analyze performance problems of the system, a O(n) algorithm, where n is the number of modules in the system, should be performed.

According to a second variant the respective first resource consumption of each of the modules of the system is modified according to a predetermined criterion. The respective first resource consumption of each of the modules of the system is expediently modified in a unique and different manner. It is particularly advantageous for the predetermined criterion to be the logarithm of a prime number. The system is then executed once and the resource consumption of all the modules is measured. The graph to be created can then be constructed from a respective resource consumption of the modules. The resource difference obtained in relation to the unchanged module is then subtracted and a prime factor decomposition of the exponentiated measurement value is carried out. The prime numbers determine uniquely those modules on which the runtime of a respective module depends. This information can then be used to create the directed graph with the desired dependencies.

The resource consumption is modified, in particular the resource consumption is increased, according to one expedient embodiment using ASPECT-ORIENTED PROGRAMMING. As a result, in the case of a software system, the code of the software system does not have to be modified directly.

A directed graph is created from the dependencies obtained. In this process the modules of the system are expediently determined for which the second resource consumption of the relevant module results exclusively from the first resource consumption of the module and the modification undertaken according to the predetermined criterion. This procedure corresponds to the location of sources in a network. A source is a node of the graph without an inward edge. This corresponds to independent modules or in the case of a software system to code fragments, which do not depend on any other module (code) in respect of runtime response. Sources represent important information for analysts and system developers and should therefore be shown specifically in a graph. A source can be identified by increasing all the modules of the system by a certain resource consumption appropriate for the measurement accuracy. After the system has been started and the measurements of respective modules have been carried out, all those modules that have increased just by this resource consumption are sources. Modules which in contrast depend on other modules would be lengthened by more than this time due to their dependencies.

The modules of the system represent nodes of the graph, between which edges run when there is a dependency between two modules, with edges being provided with a weighting factor, which reflects the degree of dependency between two modules. The weighting factor can for example be the number of times a module is called by another module. This information indicates those modules for which optimization is advantageous.

At least one embodiment of the invention also includes a computer program product, which can be loaded directly into the internal memory of a digital computer and comprises software code segments, which can be used to execute the steps according to at least one of the method, when the product operates on a computer.

BRIEF DESCRIPTION OF THE DRAWINGS

The invention is described in more detail below with reference to the figures, in which.

DETAILED DESCRIPTION OF THE EXAMPLE EMBODIMENTS

Figure 1A:
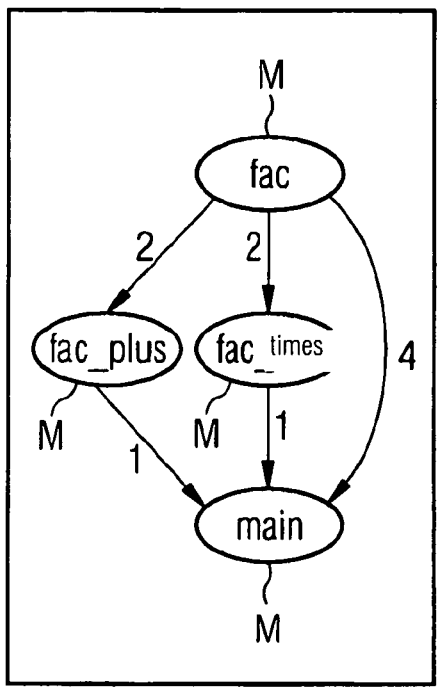
FIG. 1 shows a dependency graph of a first example embodiment.

An example embodiment of the invention is described below with reference to a software system comprising a plurality of modules. However embodiments of the invention can be used not only in software development and analysis but also for the development, analysis and documentation of general technical systems.

The principle underlying an example embodiment of the invention is based on the prolongation of one or more modules of the software system. In principle the runtime of modules is specifically increased in this process and the software system is then executed. Runtime measurements of any module can be used to reconstruct the dependencies of this module on other modules. If for example it is not known whether a module B is dependent on a module A, the runtime of module A is prolonged. If the runtime of module B then changes correspondingly, it can be seen that module B is dependent on module A.

The graph obtained by way of the method has the form of a network, in other words it is directional and its edges can contain capacity information. This capacity information can for example represent a measure of the dependency between two modules. If for example twice as long a runtime of module A results in four times as long a runtime of module B, the edge connecting modules A and B can be marked with a 2.

Another possibility is that of not considering every execution as a specific instance, if modules are executed more frequently during a program execution. Instead a module represents a node. The edges contain the number of calls as capacity information. This allows the graph to be simplified considerably, increasing its clarity.

Identification and/or graph production can take place in different ways. With a deterministic software system it is possible to increase the resource consumption of just one module artificially, start the software system and measure the dependency. This has to be done for all the modules of the software system, in order to be able to create the graph. The system must therefore be restarted at least once for each prolonged module. This procedure allows a precise graph to be created but the execution time can be very long for a complex software system.

In order to create the graph by way of prolongation, the runtime of each module of the software system can be prolonged by a different value. Any module can then be used to determine the combination of dependent modules from the runtime difference compared with the unprolonged software system.

In principle it is expedient if the lengthening takes place before the execution of the actual function. This ensures that the modules dependent on a module also have to wait. It is then also possible to identify the modules that have to wait with the aid of the prolonged time value.

If natural or real numbers are used as prolongation values, in order to analyze a number of modules simultaneously in respect of dependencies, a mathematical problem results. It is not possible simply to draw conclusions about dependent modules from the runtime difference of any module. An embodiment of the invention therefore makes provision for using the prime factor decomposition of a number which is always unique. However as the runtimes are added together and not multiplied with dependent modules, the individual modules cannot simply be lengthened by a primary number.

Based on the knowledge that the runtimes are added together, a multiplicative function can be achieved by way of the logarithm. The logarithm of a product is the sum of the logarithms of the factors. Specifically this means that if each module is prolonged by the logarithm of the runtime of a different prime number, the prime factor decomposition of the exponentiated runtime differences is again unique. It is thus possible to reconstruct the modules on which a measured module depends. For efficient implementation of the inventive method the software system should be deterministic and single-threaded in a certain frame. Nevertheless the inventive method can also be applied to multi-threaded systems.

The procedure of an embodiment of the inventive method is as follows: the runtime of each module of the software system is prolonged by the logarithm of a different prime number. The software system is executed and the runtimes of the respective modules are measured. During the analysis the measured runtime difference in relation to the unchanged module is subtracted and a prime factor decomposition of the exponentiated logarithms is carried out. It is possible to determine uniquely by means of the prime numbers the modules on which a relevant module depends. This allows the resource dependency graph to be constructed.

Because the logarithm of a prime number is used for lengthening purposes, only small values have to be added to the runtime for the unique identification of dependencies. With a deterministic system the entire graph also does not have to be constructed from one run of the system but the adjacency matrix describing the graph can be filled successively, so that only a subset of all the modules has to be lengthened in each instance.

The increasing of the resource consumption by the logarithms of the prime numbers is done by instrumenting the code. This is preferably done by ASPECT-ORIENTED PROGRAMMING. It is thus not necessary to lengthen the code of a software system to be examined directly; instead the software system can be present as a black box.

An embodiment of the inventive procedure is described in more detail below with reference to a first exemplary embodiment. Listing 1 shows a simple Java class, which adds and multiplies two factorials in its "main" function.

Listing 1

```
public class vv1 {
    public static void main(String[ ] args) {
        long l;
        l=fac_plus (1,1);
        l=fac_times (1,1);
    }
    static public long fac (long number)
    {
        long factorial = 1;
        for (int number = 1; number <= number; number++) {
            factorial = factorial * number;
        }
        return factorial;
    }
    static public void fac_plus (long number, long number2)
    {
        number = fac (number) + fac (number2);
    }
    static public void fac_times (long number, long number2){
        number = fac (number) * fac (number2);
    }
}
```

Figure 1B:
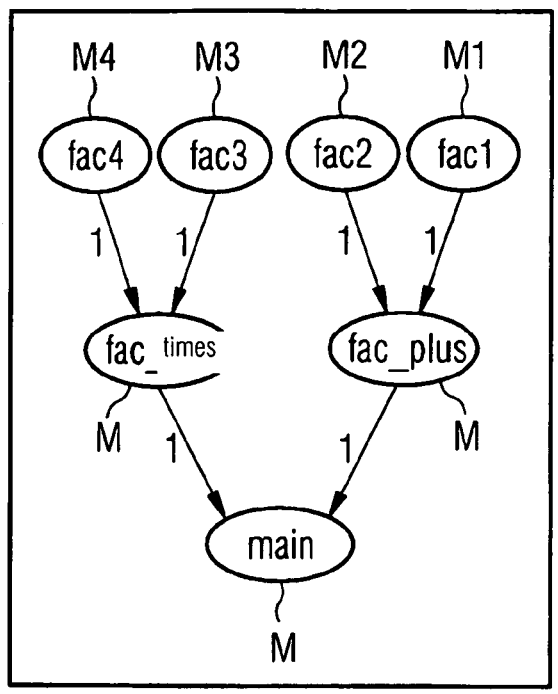

The resulting resource dependency graph is shown in FIGS. 1A and 1B. In this the modules or functions "fac", "fac_plus", "fac_times" and "main" are shown with the reference character M. The modules or functions M represent nodes of the graph. In FIG. 1B each call of the function fac has been shown as a specific instance (fac1, fac2, fac3 and fac4), these nodes being shown as M1, M2, M3 and M4.

The resource dependencies of the program shown in Listing 1 can be seen clearly in the left half of FIG. 1A. The method main in the exemplary embodiment is four times dependent on the method fac. For this reason the edge connecting the method fac and the method main is marked with the edge weight (=weighting factor) 4. The method main calls the method fac four times in total by way of the method fac_plus and the method fac_times. In the right half of FIG. 1 each call is a specific node in the graph. The edge weights are thus always equal to 1. This diagram shows the structure of the program mapped in Listing 1 in an easily traceable manner. The function main calls the function fac_times and the function fac_plus respectively once and these in turn call the factorial method fac respectively twice.

In a further example embodiment the java class from Listing 1 is extended. Two factorials are added, multiplied and exponentiated in its main function. This is shown in Listing 2:

Listing 2

```
public class vv2{
    public static void main(String[ ] args) {
        long l;
        l=fac_plus (1,1);
        l=fac_times (1,1);
        l=fac_up (1,5);
    }
    static public long fac (long number)
    {
        long factorial = 1;
        for (int number = 1; number <= number; number++) {
            factorial = factorial * number;
        }
        return factorial;
    }
    static public void fac_plus (long number, long number2)
    {
        number = fac (number) + fac (number2);
    }
    static public void fac_times (long number, long number2){
        number = fac (number) * fac (number2);
    }
    static public void fac_up (long number, long number2){
        long erg;
        for (int i = 1; i <= number2; i++)
            erg = fac (number);
        return erg;
    }
}
```

Figure 2B:
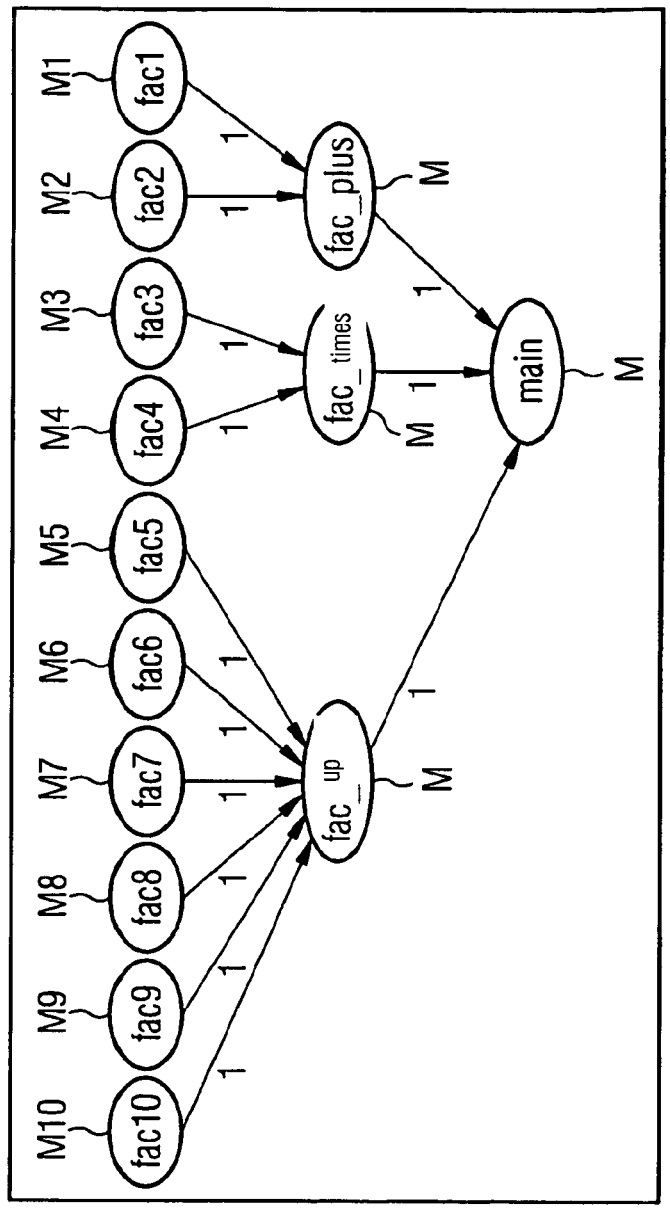
FIG. 2 shows a dependency graph of a second example embodiment.
Figure 2A:
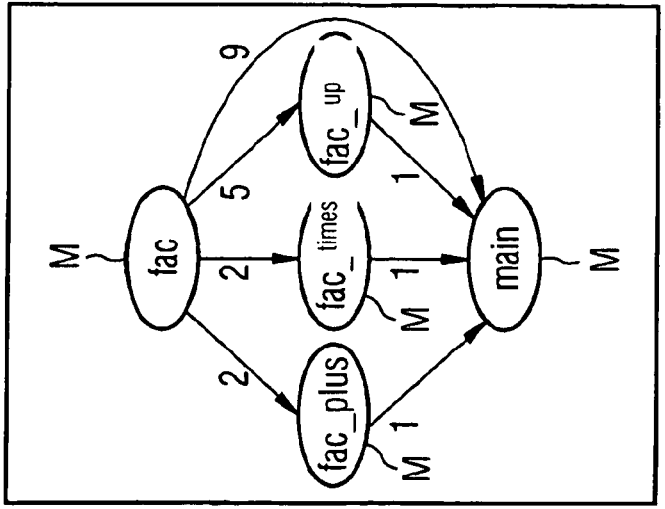

The resulting resource dependency graph is shown in FIGS. 2A and 2B. FIG. 2A shows the resource dependencies in the software system very clearly. The method main is nine times dependent on the method fac (edge weight 9). The method main calls the methods fac_plus, fac_times and fac_up respectively once. The methods fac_plus and fac_times call the method fac respectively twice and the method fac_up calls the method fac five times. The corresponding edges are provided with the respective capacity information. FIG. 2B shows each call of the method fac as a specific node M1, . . . , M10. The edge weight between the methods fac_up, fac_times and fac_plus and the method main is therefore always equal to 1.

The code of the software systems or programs shown in Listing 1 and Listing 2 was instrumented with the aspects shown in Listing 3. These take over the prolongation of the execution time of the methods. Data evaluation is not shown. This can be done in an automated process or in a table calculation program.

Listing 3

```
package GraphAnalysis;
import trace.*;
public aspect Graph {
    declare precedence : Trace2,Graph;
    static long p1 = 0; // 2(1 * 1000);
    static long p2 = 0;// 3(int) (1.584962501 * 1000);
    static long p3 = 0;// 5(int) (2.321928095 * 1000);
    static long p4 = 0;// 7 (int) (2.807354922 * 1000);
    static long p5 = 0; // (int) (3.459431619 * 1000);
    static long p6 = 0; // (int) (3.700439718 * 1000);
    pointcut Tfac( ): (call (* *.fac (..))) ;
    pointcut fac_up( ): call (* *.fac_up (..)) ;
    pointcut fac_times( ): call (* *.fac_times (..)) ;
    pointcut fac_plus( ): call (* *.fac_plus (..)) ;
    Object around( ): Tfac( ){
        try {
            return proceed( );
        } finally {
            long dt = System.nanoTime( );
            while ((System.nanoTime( ) - dt)/1000 < p1)
            ;
        }
    }
    Object around( ): fac_up( ){
        try {
            return proceed( );
        } finally {
            long dt = System.nanoTime( );
            while ((System.nanoTime( ) - dt)/1000< p2)
            ;
        }
    }
    Object around( ): fac_times( ){
        try {
            return proceed( );
        } finally {
            long dt = System.nanoTime( );
            while ((System.nanoTime( ) - dt)/1000 < p3)
            ;
        }
    }
    Object around( ): fac_plus( ){
        try {
            return proceed( );
        } finally {
            long dt = System.nanoTime( );
            while ((System.nanoTime( ) - dt)/1000 < p4)
            ;
            //System.out.print (p4);
        }
    }
    public static void main(String[ ] args) {
        system2analyze.vv1.main(args);
        p1 = (1 * 1000000);
        p2 = (long) (1.584962501 * 1000000);
        p3 = (long) (2.321928095 * 1000000);
        p4 = (long) (2.807354922 * 1000000);
        p5 = (long) (3.459431619 * 1000000);
        p6 = (long) (3.700439718 * 1000000);
```

Listing 3 -continued

```
        system2analyze.vv1.main(args);
    }
}
```

Figure 3:
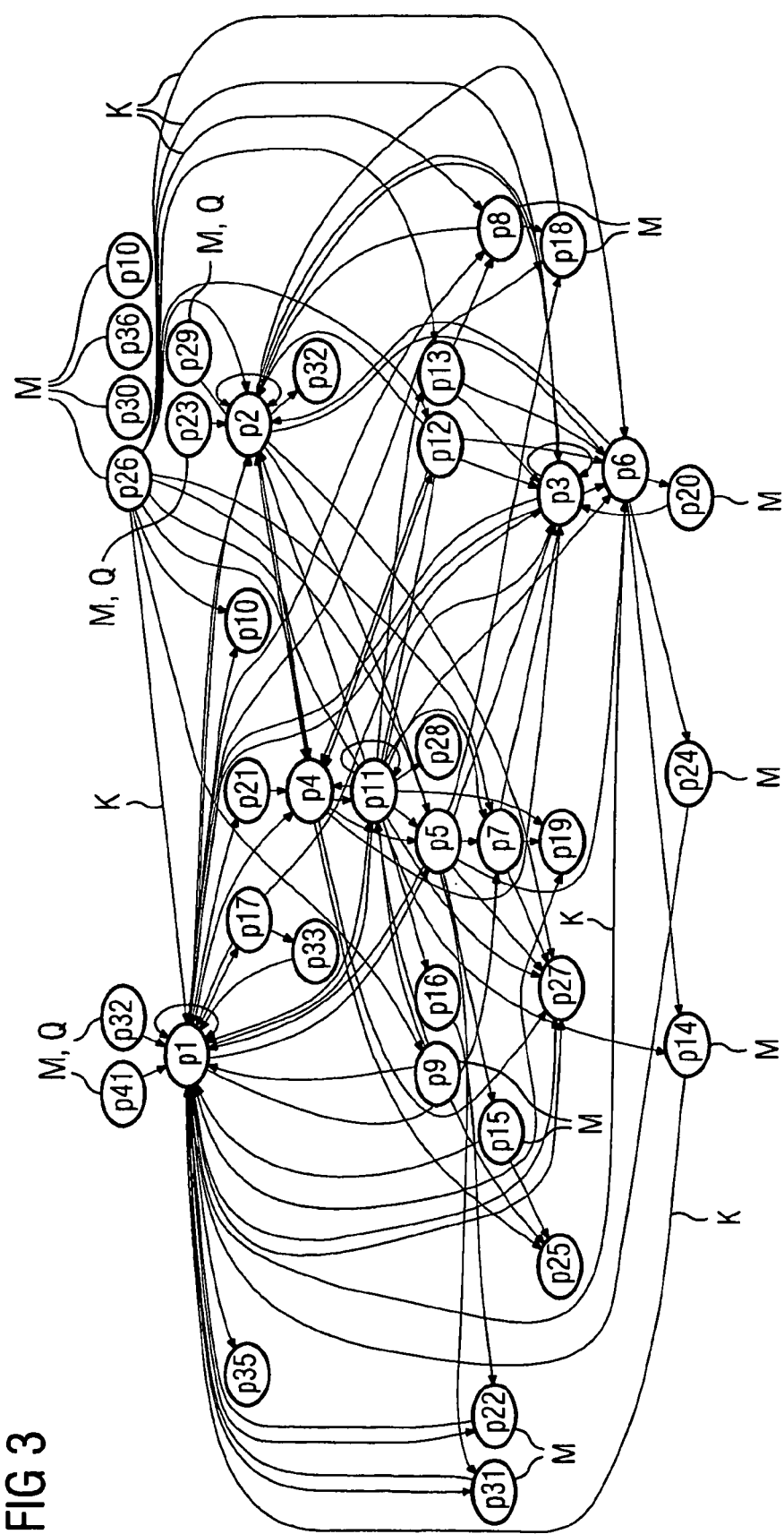
FIG. 3 shows a schematic dependency graph obtained by way of an embodiment of the inventive method.

FIG. 3 shows a further resource dependency graph of a complex software system, which is not described in more detail. Methods here are shown with the reference character M. Each method pi (i is a real number to identify a specific module) represents a node in the graph. The reference character K identifies edges, each connecting two modules M, which have a dependency in relation to one another. Q identifies sources, which represent a node or inward edges in the network. This corresponds to independent modules. Independent modules are modules which do not depend on any other module with regard to runtime. Independent modules represent important information for analysts and system developers. It is therefore recommended that independent modules should also be identified specifically as sources in the graph.

An independent module can be identified as follows in a deterministic system: All the modules in the system are increased by a certain runtime appropriate for the measurement accuracy. After measurement all the modules that have only been lengthened by this runtime are sources. Modules which depend on other modules are lengthened by more than this time due to their dependencies.

Figure 4:
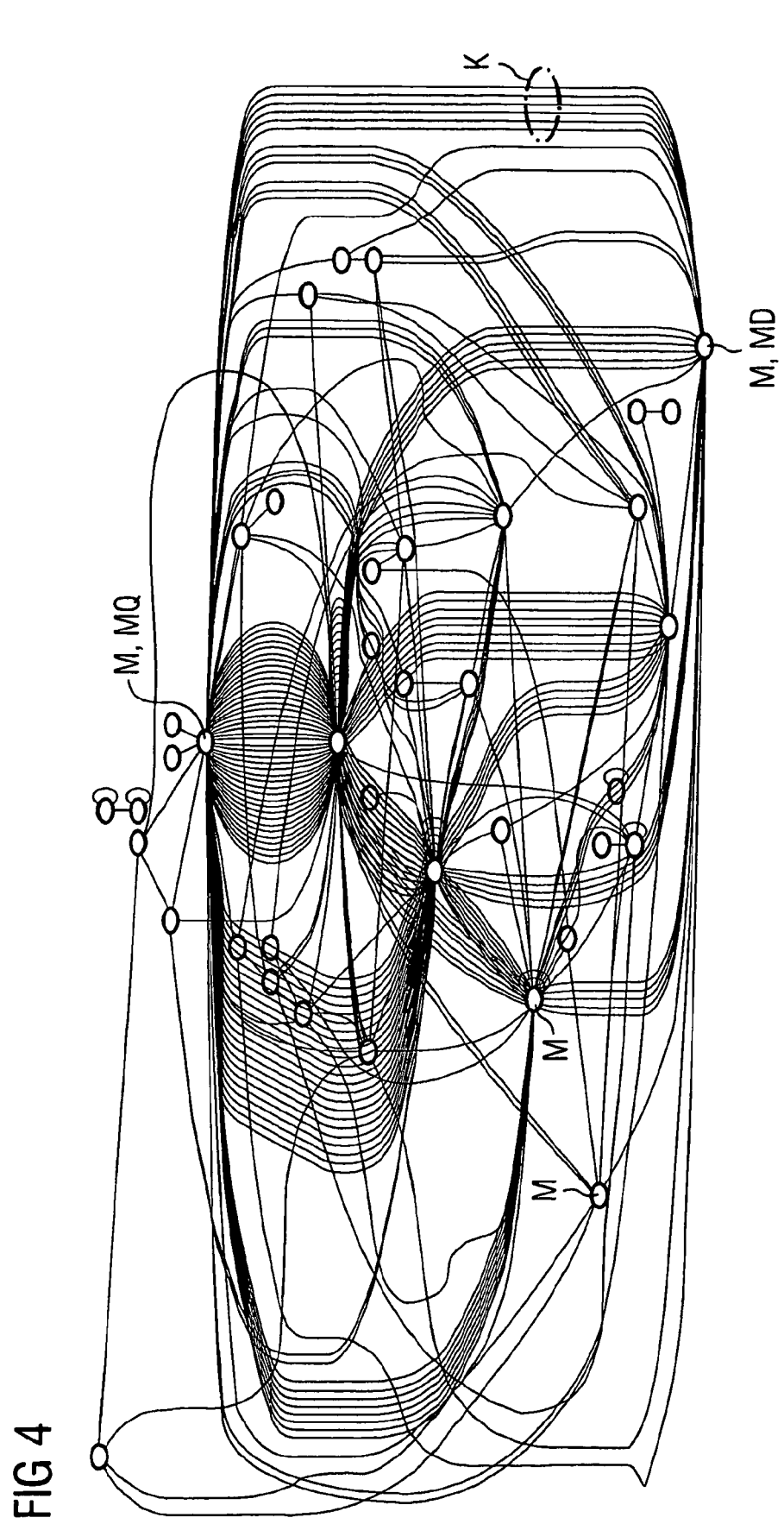
FIG. 4 shows the dependency graph shown in FIG. 3 in a different representation showing the degree of dependency between two modules.

FIG. 4 shows another representation of a resource-dependent graph of a software system. Here the edges connecting the two modules contain no capacity information. Instead a specific edge K is marked for each call or each dependency. Thus for example there are six connections, in other words edges K, by way of example between the node MQ, which represents a calling module, and the node MD, which represents a called module. This means that there is a six times dependency between the modules MQ and MD.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for computer-aided determination of dependencies of a plurality of modules of a technical system, with each of the modules of the system having a known, first runtime, the method comprising:
    modifying the first runtime of at least one of the modules by prolonging the runtime by a logarithm of a prime number, resulting in a modified system where the first runtime of each of the modules of the system is unique and different;
    executing the modified system;
    measuring a second runtime for each of the modules of the modified system, the second runtime resulting from the modification of the first runtime of the at least one module; and
    determining whether there is a dependency between a respective module and the at least one module with modified runtime by,
    determining differences between the first runtimes and the second runtimes,
    exponentiating the determined differences, and
    performing a prime factor decomposition on the exponentiated determined differences.

2. The method as claimed in claim 1, wherein the modification of the first runtime of the at least one module is an increase in the first runtime.

3. The method as claimed in claim 1, wherein the first runtime of just one of the modules is modified.

4. The method as claimed in claim 3, wherein the method is repeated according to the number of modules in the system, with the runtime of a different module being modified with each repetition, so that each module of the system undergoes a modification just once.

5. The method as claimed in claim 1, wherein the runtime is modified using ASPECT-ORIENTED PROGRAMMING.

6. The method as claimed in claim 1, wherein a directed graph is created from the dependencies obtained.

7. The method as claimed in claim 6, wherein the modules of the system are determined for which the second runtime of the relevant module results exclusively from the first runtime of the module and the modification undertaken according to the criterion.

8. The method as claimed in claim 7, wherein the modules of the system represent nodes of the graph, between which edges run when there is a dependency between two modules, with edges being provided with a weighting factor, which reflects the degree of dependency between two modules.

9. A computer program product, loaded directly into the internal memory of a digital computer, comprising software code segments, useable to execute the steps according to claim 1, when the product operates on a computer.

10. The method of claim 1, wherein the method is for computer-aided determination of dependencies of a plurality of modules of a software system.

11. The method as claimed in claim 1, wherein the method is repeated according to the number of modules in the system, with the first runtime of a different module being modified with each repetition, so that each module of the system undergoes a modification just once.

12. A non-transitory computer readable medium storing program segments for, when executed on a computer device, causing the computer device to implement the method of claim 1.

* * * * *